United States Patent [19]

Hermann

[11] Patent Number: 5,057,929
[45] Date of Patent: Oct. 15, 1991

[54] CATHODE RAY TUBE HAVING IMPLOSION BAND WITH RAISED TABS AND METHOD

[75] Inventor: Kenneth W. Hermann, Rochester, N.Y.

[73] Assignee: North American Philips Corporatioon, New York, N.Y.

[21] Appl. No.: 252,953

[22] Filed: Sep. 30, 1988

[51] Int. Cl.⁵ .............................................. H04N 5/65
[52] U.S. Cl. .................................. 358/246; 358/245; 220/2.1 A
[58] Field of Search ............... 358/245, 246, 247, 248; 220/2.1 A, 2.3 A

[56] References Cited

U.S. PATENT DOCUMENTS

| | | | |
|---|---|---|---|
| 4,360,837 | 11/1982 | Kreidler et al. | 358/246 |
| 4,641,196 | 2/1987 | Musha et al. | 358/245 |
| 4,700,260 | 10/1987 | Craig et al. | 315/8 |
| 4,858,016 | 8/1989 | Suehiro et al. | 358/245 |

Primary Examiner—Joseph A. Orsino
Assistant Examiner—Thomas D. Lee
Attorney, Agent, or Firm—John C. Fox

[57] ABSTRACT

An implosion band for a cathode ray tube has a plurality of raised tabs distributed about the periphery of the rearward edge of the band to accommodate attachment of additional tube components such as degaussing coils. The tabs are formed by: punching narrow slots in a strip of band material, near a longitudinal edge of the strip; forming the strip into a hoop by butt welding the ends of the strip; and stretching the hoop into a rectangular band while at the same time displacing outwardly the band material between the slot and the edge of the band to form the tabs.

15 Claims, 4 Drawing Sheets

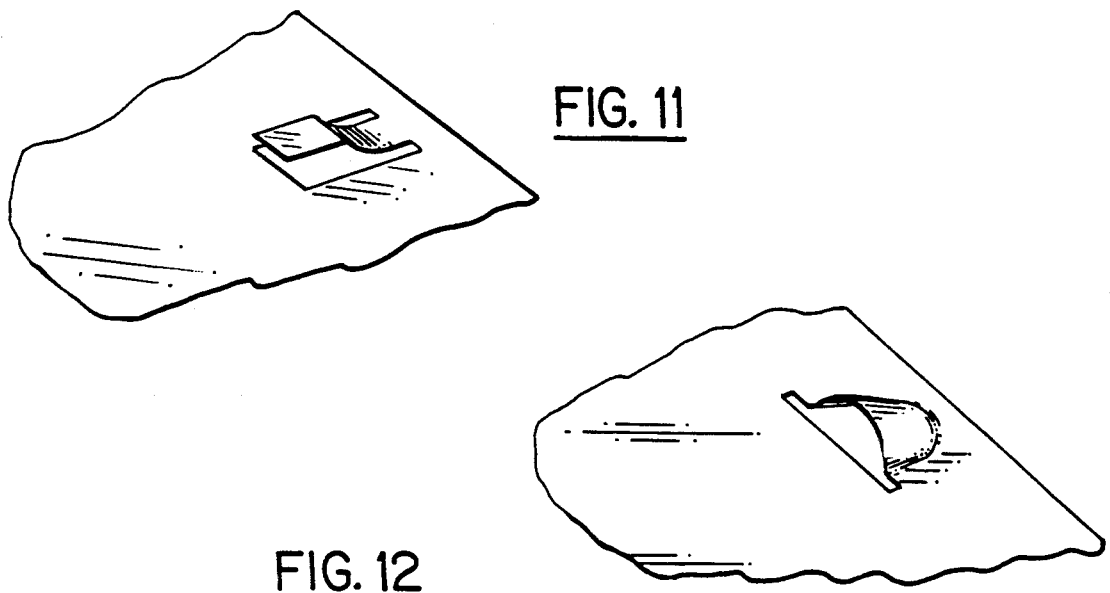
FIG. 11
FIG. 12
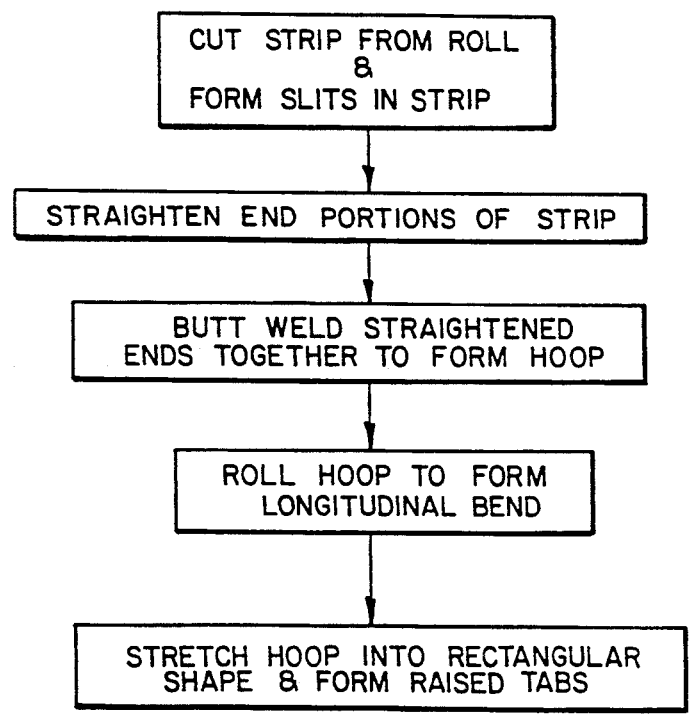
FIG. 13

5,057,929

CATHODE RAY TUBE HAVING IMPLOSION BAND WITH RAISED TABS AND METHOD

BACKGROUND OF THE INVENTION

This invention relates to cathode ray tubes (CRTs) of the type having an implosion band, and more particularly relates to such tubes having an implosion band with means for attachment of components such as degaussing coils, and also relates to a method for producing such a band.

Color CRTs for color television and allied display applications basically comprise an evacuated glass envelope including a face panel portion and a funnel portion, a phosphor screen on the interior surface of the face panel, and an electron gun in the neck of the funnel for generating electron beams to excite the phosphor elements on the screen.

It is customary to place the face panel in mechanical compression by strapping a steel band around the side wall or skirt of the panel, so that in the unlikely event of an implosion, the glass fragments will tend to be contained within the tube area or only a short distance away from it. Such bands are known as implosion bands. A particular type of implosion band is the so-called tension band, which is applied by wrapping it around the panel skirt, overlapping the ends and fastening these overlapped ends with a tensioning device.

A newer type of implosion band which is coming into increasing use is the shrink band. This is a steel band which is joined end-to-end and pre-formed prior to placement on the CRT panel. The formed band is heated to cause thermal expansion sufficient to allow placement of the band around the panel skirt, and then allowed to cool and "shrink" onto the panel, thereby placing the band in tension and the panel in compression.

Implosion bands often perform an added function of supporting tube mounting brackets, used to mount the tube in a display cabinet. In addition, such bands often serve to secure other CRT parts or components, such as clips for holding degaussing coils. In a typical arrangement, the band has sufficient width so that a portion extends rearward over the seal between the faceplate and the funnel portion of the envelope, to form its own skirt portion spaced a small distance above the inwardly curving surface of the funnel. The width and placement of the band are chosen so that sufficient clearance is provided between the band skirt and the funnel to allow attachment of clips to the band through openings formed in the band skirt by a separate punching operation. Additional clearance may be provided by forming the band skirt with a slight outward offset from the body of the band. See in this regard Toshiba Japanese patent applications 55-111048 and 55-96541.

In addition to the extra band width required to form the skirt, and the separate punching operation needed to form the openings in the skirt, the presence of the skirt tends to interfere both with the mounting of components such as degaussing coils on the tube funnel, and with the mounting of the tube in the television cabinet.

SUMMARY OF THE INVENTION

Accordingly, it is an object of the invention to provide an implosion band for a cathode ray tube including means for accommodating the attachment of other tube components, which band does not include an offset skirt portion.

It is another object of the invention to provide a simple method for producing such a band.

In accordance with one aspect of the invention, there is provided a cathode ray tube having an implosion band including at least one and preferably a plurality of raised tab portions spaced around the periphery of the band in the vicinity of the rearward edge of the band, the raised tab portions for accommodating attachment of additional tube components such as degaussing coils.

According to a preferred embodiment of this aspect of the invention, each tab has a forward edge and a rearward edge, the rearward edge corresponding substantially to the rearward edge of the band.

According to another preferred embodiment of this aspect of the invention, each tab comprises a bridge or loop of band material upstanding from the band to form a handle-shaped tab.

In accordance with another aspect of the invention, a method is provided for forming such a band, the method comprising the steps of:

a) forming at least one slot in a metal strip near one edge of the strip, b) forming the strip into a rectangular band having an outline corresponding to that of the face panel of the CRT, and c) displacing a portion of the band material between the band edge and the slot to form a raised tab.

In accordance with a preferred embodiment of the invention, the slot is longitudinally oriented with respect to the strip, and the distance from the nearest strip edge to the nearest longitudinal slot edge defines the width of the tab.

In accordance with another preferred embodiment of the method of the invention, the tabs are formed simultaneously with the formation of the rectangular band.

In accordance with still another preferred embodiment of the method, the strip is obtained from a roll of strip material and the slot is formed simultaneously with the separation of the strip from the roll.

BRIEF DESCRIPTION OF THE DRAWINGS

FIGS. 10, 11 and 12 are perspective views similar to that of FIG. 8 showing a transversely oriented bridge-shaped tab, a transversely oriented hook-shaped tab and a pocket-shaped tab, respectively.

FIG. 13 is a block diagram of one embodiment of the method of the invention.

DESCRIPTION OF THE PREFERRED EMBODIMENTS

Figure 1:
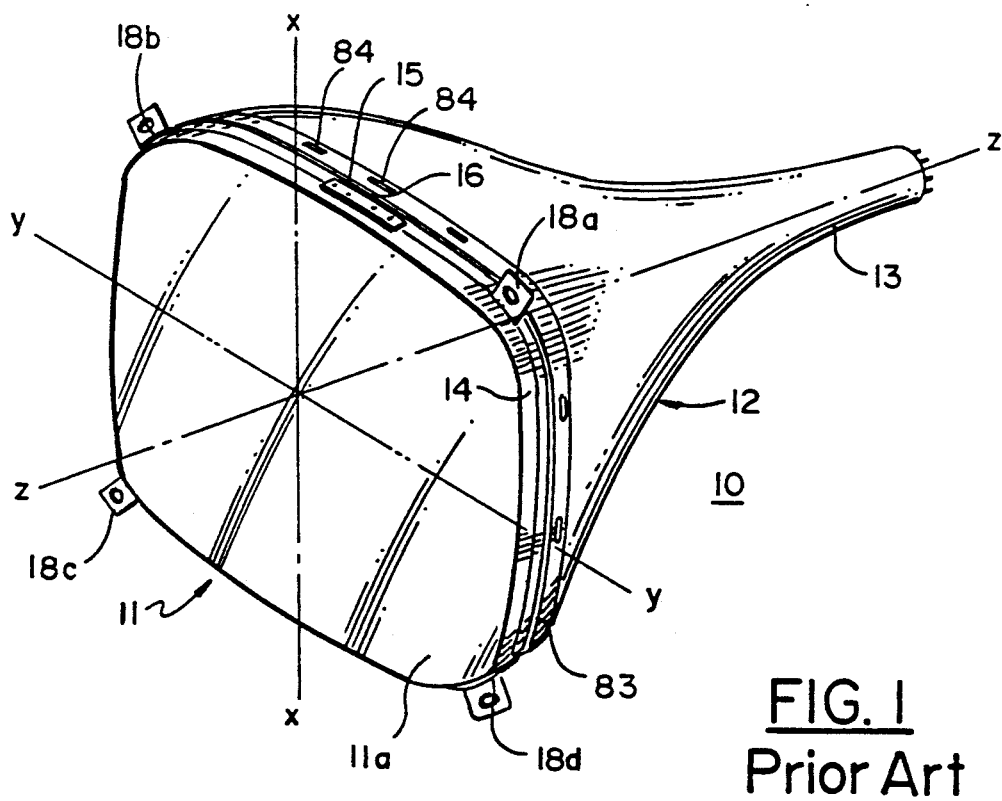
FIG. 1 is a perspective view of an implosion banded cathode ray tube of the prior art having an off-set band skirt with openings for attachment of tube components.
Figure 2:
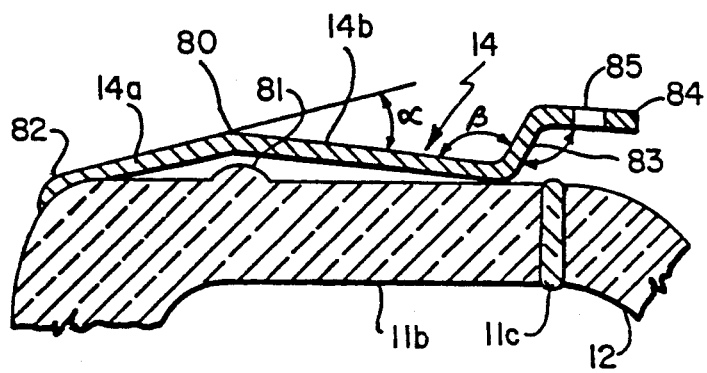
FIG. 2 is a section view of a portion of the CRT faceplate and funnel with associated implosion band of FIG. 1.

Referring now to FIGS. 1 and 2, there is shown an implosion-banded cathode ray tube 10 of the prior art, oriented with reference to x, y and z axes. The tube envelope comprises glass face panel 11 and funnel 12 having a neck portion 13. The glass face panel 11 includes rectangular face 11a and peripheral sidewall or skirt 11b joined to funnel 12, by a frit seal 11c. The skirt 11b and frit seal 11c are obscured by implosion band 14 in FIG. 1, but are shown in the section view of FIG. 2 of a portion of the panel 11, funnel 12 and band 14.

Band 14 is a shrink band, so called because it is preformed, and then expanded by heating to fit around the panel skirt, and finally allowed to cool, thereby shrinking around the skirt to place the panel in mechanical compression.

The band is formed by first cutting a length of steel strip from a roll, straightening end portions of the strip and then butt welding the straightened ends together to form an egg-shaped hoop. This hoop is then passed between rollers which form a shallow longitudinal bend and an off-set portion in the hoop. The shallow bend effectively raises the central portion 80 of the band 14 slightly above the glass surface, to form a forward portion 14a and a rearward portion 14b, both sloping away downwardly from the central portion 80 to provide clearance for the mold match line 81 on skirt 11b, as shown in FIG. 2. Bend angle alpha ($\alpha$) is typically about 5°. The off-set portion is formed by making two deep longitudinal bends to result in a ledge 83 and off-set skirt portion 84, into which openings 85 are later formed to accommodate clips for holding degaussing coils, not shown, on the funnel surface. The skirt bend angle beta ($\beta$) is typically about 150°.

After bending, the hoop is stretched into a rectangular shape corresponding to the outline of the face panel, using stretcher blocks, and the forward edge of the corner portions are rolled over slightly to provide a snug fit with the corners of the face panel. This rolled edge, 82 in FIG. 2, is sometimes referred to as an "eye brow".

Following stretching, fish plate 15, a rectangular metal plate, is welded onto the band 14 across the butt weld 16 for added strength, and four tube mounting brackets (18a, 18b, 18c and 18d) are welded to the corner portions of band 14, and as shown in FIG. 1.

Next, openings 85 are formed in the band skirt, for example, by simultaneous punching with a plurality of separate, spaced apart hydraulic punches. Next, band 14 is positioned accurately in the x-y plane, heated to allow band expansion, after which the tube is inserted into the band and the band is allowed to shrink in place on the panel skirt.

Figure 3:
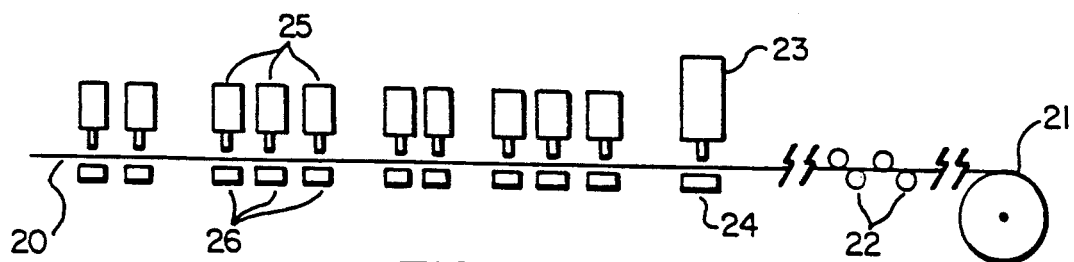
FIG. 3 is a schematic diagram illustrating apparatus suitable for carrying out certain steps of a preferred embodiment of the method of the invention.
Figure 4:
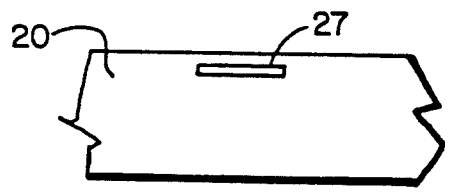
FIG. 4 is a plan view of a portion of a strip after carrying out the steps of FIG. 3.

In accordance with one aspect of the invention, the band forming process of the prior art as described above is modified in several respects to eliminate the skirt with openings and to provide instead raised tabs in the rearward portion of the band. This is accomplished by a multi-step operation in which narrow slots are cut, punched or otherwise formed in the steel strip, preferably while it is being cut to length from a supply roll. This can be accomplished, for example, by placing a plurality of slotting stations forward of the cutoff die, as shown in FIG. 3, feeding strip 20 from supply roll 21 through straightener rolls 22, past centrifugal press 23 having cutoff die 24 to a predetermined cutoff position. Small centrifugal punch presses 25 similar to press 23 used for cutoff, each having a die 26, form the desired narrow slots 27 in the strip, one of which is shown in FIG. 4.

The length of the slots must be sufficient to accommodate uncontrollable band rotation during stretching, which may result in some lateral offset of the slots from their desired positions.

End portions of the slotted strip are then straightened and butt welded together to form a hoop, and the hoop is rolled as described above. However, the rolling dies are now contoured to result in a single shallow longitudinal bend to provide the necessary clearance for the mold match line, thus eliminating the off-set skirt of the prior art. The thus rolled hoop is then formed into a rectangular shape, for example, using stretcher blocks 30 as shown in FIG. 5.

In accordance with one embodiment of the invention, the stretcher blocks of the prior art are modified by adding protrusions 31 in locations corresponding to the area of the bands between the slots and the nearest edge of the band, and providing forming blocks 32, each having an indentation complementary in shape to the corresponding protrusion of the stretcher block.

Figure 5:
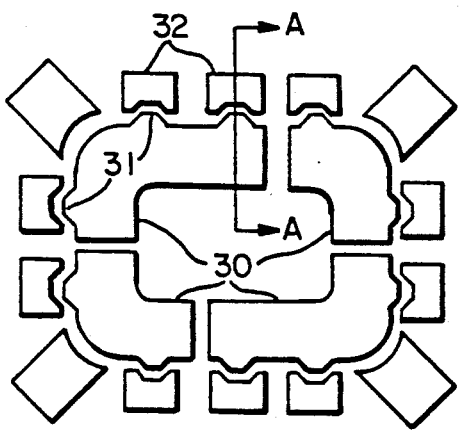
FIG. 5 is a schematic diagram illustrating apparatus suitable for carrying out certain steps of another preferred embodiment of the method of the invention.
Figure 6:
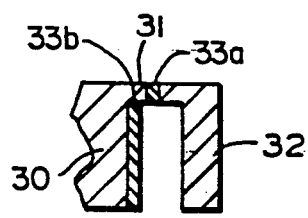
FIG. 6 is a section view along line A—A of the apparatus of FIG. 5.
Figure 7:
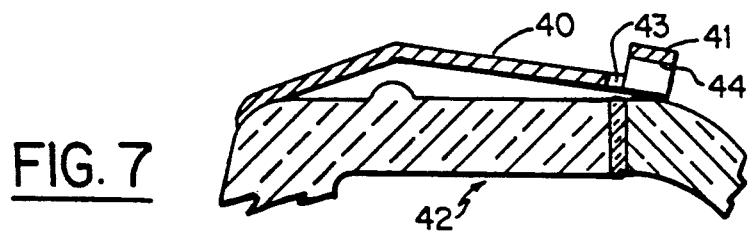
FIG. 7 is a section view of a portion of a CRT faceplate and funnel with associated implosion band in accordance with the teachings of the invention.
Figure 8:
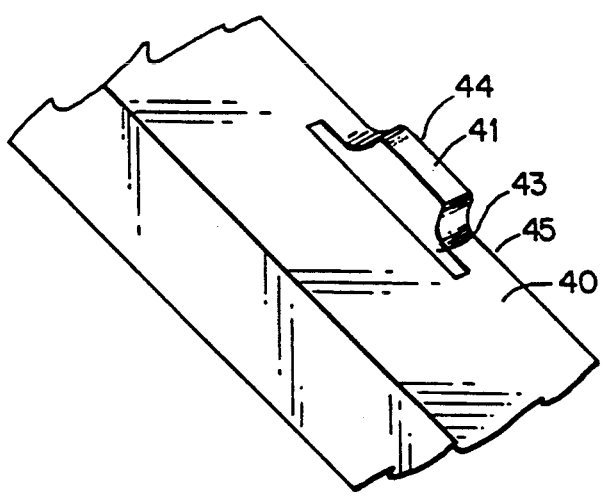
FIG. 8 is a perspective view of a portion of an implosion band of the invention showing a longitudinally oriented bridge-shaped raised tab.

FIG. 6, a section view along line A—A of FIG. 5, shows the effect of stretching the band material 33 above the slots 33b. That is, the material 33 is displaced outwardly to form the desired raised tab portions 33a. A stretched band 40, with a raised bridge-shaped tab 41 is shown in section on envelope 42 in FIG. 7, and in perspective in FIG. 8. As shown in FIG. 8, slot 43 is somewhat longer than tab 41 in order to accommodate for uncontrollable band rotation during stretching, which could result in lateral shifts in the slot position.

Figure 9:
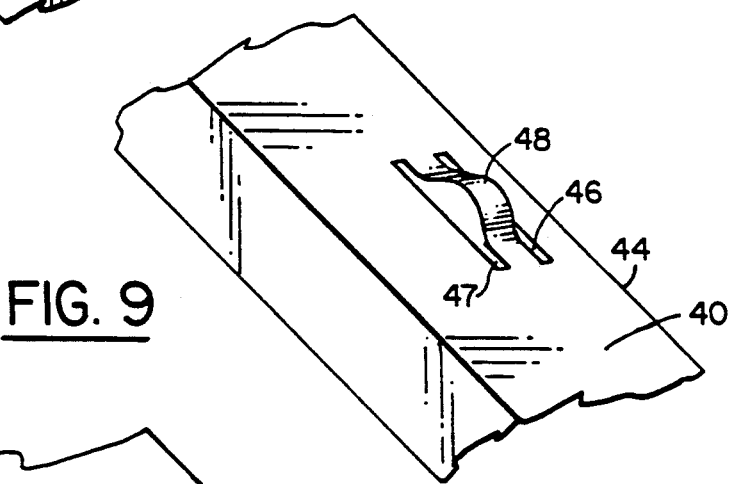
FIG. 9 is a perspective view similar to that of FIG. 8 showing a longitudinally oriented loop-shaped raised tab.

While the rearward edge 44 of the tab 41 correspond to the rearward edge 45 of the band 40 in the embodiment shown, it is of course possible to form the tabs from two narrow slots 46 and 47 placed inwardly from the rear edge 44 of the band 40, such as shown for loop-shaped tab 48 in FIG. 9. Such placement might result in increased rigidity of the structure, but might also require increased band width.

Figure 10:
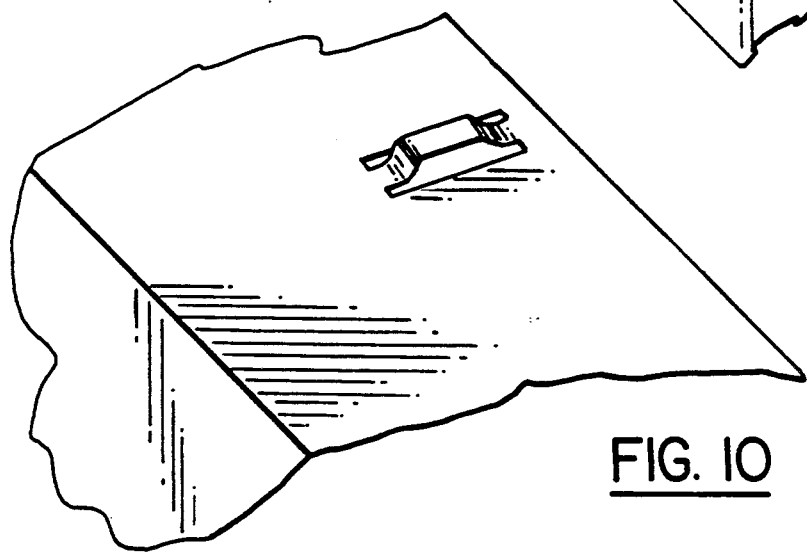

The invention has been described in terms of a limited number of embodiments. Other embodiments will become apparent to those skilled in the art. Thus, the raised tabs on the tension band need not be formed longitudinally but may be formed with a transverse orientation as shown in FIG. 10. Furthermore, the tabs need not be in the form of loops or bridges, but may also be hook-shaped or pocket-shaped as shown in FIGS. 11 and 12.

What is claimed is:

1. A method of forming a metal shrink band for a cathode ray tube, the tube comprising an evacuated glass envelope, the envelope comprising a face panel portion having a peripheral sidewall portion and a funnel portion sealed to the sidewall portion, the band having at least one raised tab to accommodate the attachment of tube components, the method comprising the steps of:

a) cutting a length of metal strip from a supply roll, b) forming at least one slot in the strip near one longitudinal edge of the strip while it is being cut from the roll, c) straightening end portions of the slotted strip, d) butt welding the end portions to form a hoop, e) forming the hoop into a rectangular band having an outline corresponding to that of the face panel of the tube, and f) displacing a portion of the band material adjacent the at least one slot to form a raised tab.

2. The method of claim 1 in which the slot is oriented longitudinally, the distance from the nearest longitudinal band edge to the nearest longitudinal slot edge defining the width of the tab, and the band material between the band edge and the edge of the slot is displaced to form a bridge-shaped or loop-shaped tab.

3. The method of claim 1 in which a plurality of tabs distributed around the periphery of the band are formed.

4. The method of claim 3 in which three tabs are formed on each of the long sides and two tabs on each of the short sides of the rectangular band.

5. The method of claim 1 in which the tab is formed simultaneously with the formation of the rectangular band.

6. The method of claim 5 in which the rectangular band is formed by butt welding ends of the strip to form a hoop and stretching the hoop with stretcher blocks.

7. The method of claim 6 in which displacement of band material to form tabs is achieved by engagement of the material with protrusions on the stretcher blocks during stretching.

8. The method of claim 1 in which the strip is cut from a roll, and the slot is formed simultaneously with the separation of the strip from the roll.

9. The method of claim 1 in which a pair of laterally adjacent slots are formed for each desired tab, the distance between the adjacent longitudinal edges of the slots defining the width of the tab, and the band material between the adjacent slots is displaced to form a bridge-shaped or loop-shaped tab.

10. A cathode ray tube comprising an evacuated glass envelope, the envelope comprising a face panel portion having a rectangular face panel and a peripheral sidewall portion, a funnel portion sealed to the sidewall portion, a metal shrink band located around the periphery of the sidewall portion, and a plurality of mounting brackets attached to the band the band including at least one raised tab in the vicinity of the rearward edge of the band for accommodating attachment of additional tube components, characterized in that the tab is located entirely within the periphery of the band.

11. The cathode ray tube of claim 10 in which a plurality of raised tabs are spaced around the periphery of the band.

12. The cathode ray tube of claim 10 in which each tab is longitudinally oriented and has a forward edge and a rearward edge.

13. The cathode ray tube of claim 12 in which the rearward edge of the tab corresponds to the rearward edge of the band.

14. The cathode ray tube of claim 13 in which each tab is bridge-shaped or loop-shaped.

15. The cathode ray tube of claim 13 in which each tab is hook-shaped or pocket-shaped.

* * * * *